April 16, 1940.   G. PIERSON   2,197,225
BEET HARVESTER
Filed Oct. 31, 1931   2 Sheets-Sheet 1
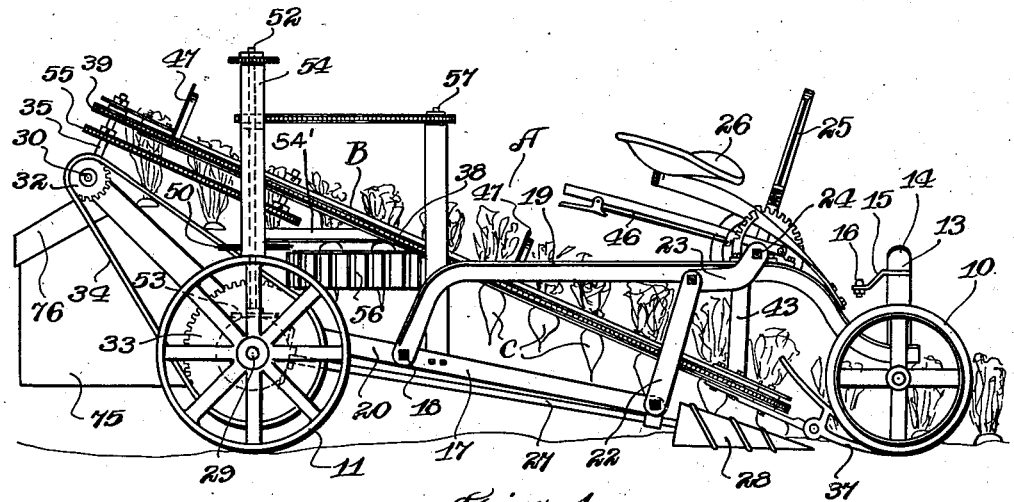
Fig. 1
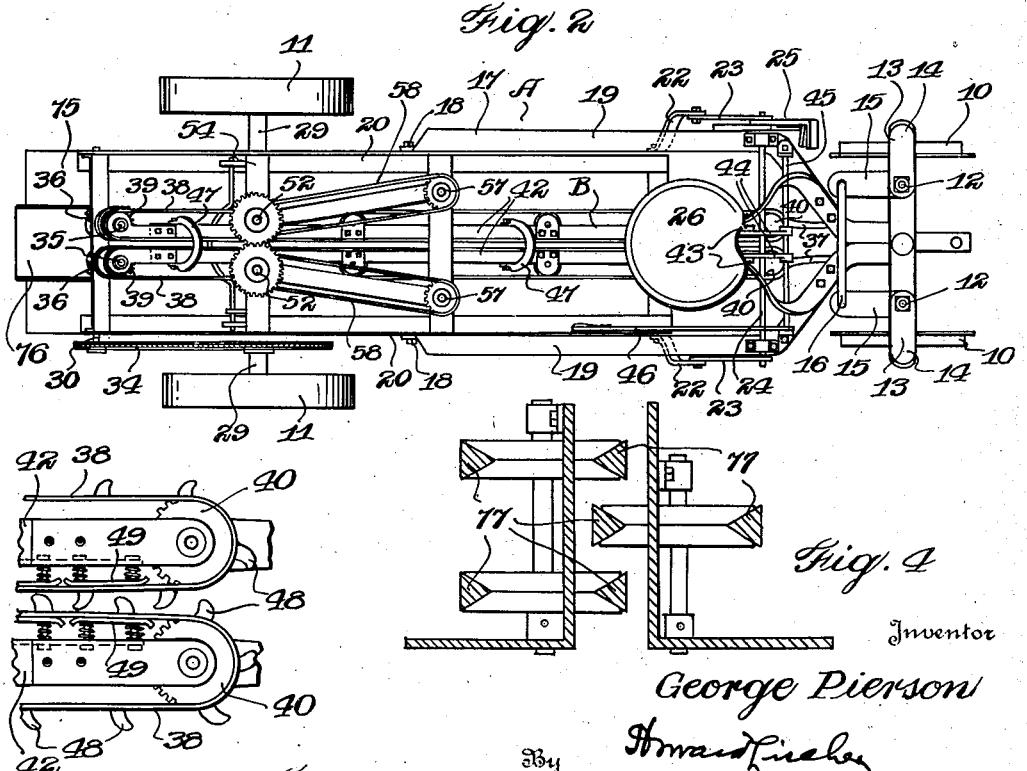
Fig. 2
Fig. 3
Fig. 4
Inventor
George Pierson
By Howard Finley
Attorney

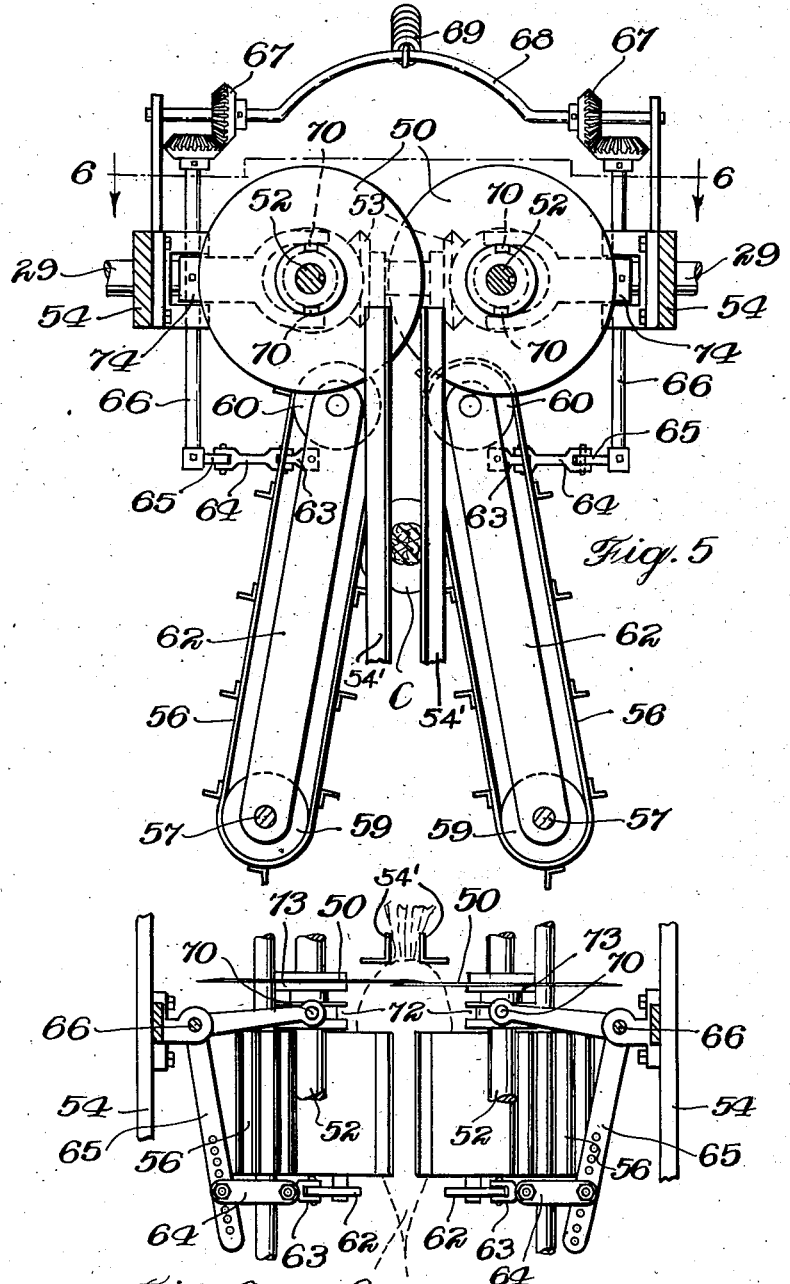

Patented Apr. 16, 1940

2,197,225

UNITED STATES PATENT OFFICE 2,197,225

BEET HARVESTER

George Pierson, Chaska, Minn., assignor of one-half to John A. Diethelm, Victoria, Minn.

Application October 31, 1931, Serial No. 572,317

14 Claims. (Cl. 55—108)

My invention relates to an improvement in beet harvesting machines, particularly adapted for the digging and topping of beets and other vegetables and herbs having a leafy top and extending into the earth.

It is the object of my invention to overcome some of the difficulties encountered in harvesting machines of this nature, and to provide a practical machine to dig and top the beets in a continuous operation. I provide a device capable of engaging the beet tops, digging the beets, elevating the beets by means of their tops, and cutting the tops from the beets at a time when the beets are positively engaged and supported. I have therefore accomplished a long felt want for a machine which supports the vegetable while it is being topped, and positions each beet in the same position to be topped.

It is a feature of my invention that by means of my topping apparatus, the beets are cut off or topped at the proper point for each particular beet. In other words, the diameter of each beet regulates the point at which the beet is topped. This is extremely important for the reason that when beets are harvested manually, large diameter beets are topped at a greater distance from the base of the leaves than are small diameter beets. I have so arranged my topping cutters that the diameter of the beet adjacent the cutters regulates the height of the cutters and acts to lower the cutters so as to cut off more of the top of such a beet in proportion to the diameter thereof, as is done when the operation is manual.

It is a feature of my invention that the beets are elevated suspended vertically from the elevating chains or belts, and that before coming into contact with the topping cutters, each beet is drawn into engagement with a horizontal guide which bears against the top surface of each beet. Accordingly, each beet is in the same identical relationship when passing along these guides, and whether the beet is supported close to the elevator or not during the lifting of the beet to the guides is immaterial, as the position is adjusted by the guides before the beet is topped.

It is an added feature that each beet being topped is held in vertical alignment by a pair of butter belts which act to butt the beets against the cutter discs, and support the beets in proper position while the same are being topped. The belts are provided with vertical cleats which hold the beets vertically as the cutting is started. The beets emerge from the butter belts preferably slightly before the cutting action is completed, so that the beets are free to drop into a receptacle or onto a conveyor when freed from their tops.

It is an important feature of my invention that the tops of the beets are completely freed from the vegetable itself, and are deposited at a point remote from the vegetables. This obviates the necessity of separating or picking over the beets after they have been harvested, and puts the crop into condition to be shipped or stored.

It is a feature of my invention that the chains or belts acting as elevators for the beets are mounted resiliently to accommodate for various sizes of beet tops. By this means a beet having very little foliage is readily supported as well as beets having a great amount of leaves.

These features and novel objects of my invention together with others which will become apparent will be more clearly brought out in the following specification and claims.

In the drawings forming a part of this specification:

Figure 1 is a side elevation view of my harvester in operation.

Figure 2 is a top plan view of the harvester illustrated in Figure 1.

Figure 3 is a detail plan view of the lower end of the elevators.

Figure 4 is a cross-sectional view through a slightly different modification of elevator construction.

Figure 5 is a plan view of the beet topping mechanism.

Figure 6 is a cross-sectional view on the lines 6—6 of Figure 5.

My beet harvester A is preferably mounted upon front wheels 10 and rear wheels 11. Vertical spindles 12 to which the axles of the front wheels 10 are connected are each provided with a bell crank 13, one arm 14 of which acts as a foot lever by means of which the harvester A may be steered. The other arms 15 are connected together by means of a connecting link 16 to permit the motion of one crank 13 to be transmitted to the other.

The frame 17 of the harvester A is made of two sections, a front section and a rear section, which are pivoted together at the point 18, at the rear end of the front section 19. The pivoting point 18 is positioned approximately midway between the ends of the rear portion 20 of the frame, and the front end of this rear portion 20 is pivoted to a link 22 which in turn is connected to a lever 23 mounted upon a shaft 24 and rotatable by means of a suitable lever 25.

It may be seen that as the shaft 24 is rotated by the lever 25, the lever 23 is raised or lowered, raising or lowering the front end of the rear portion 20 of the frame 17. The seat 26 is mounted on the front portion 19 of the frame in proper position to accommodate the operator.

The rear portion 20 of the frame 17 acts as a support for the shafts 27 driving the digging cones 28. The shafts are driven through suitable bevel gearing by the rear wheels 11 on the rear axle 29.

The rear portion 20 of the frame 17 extends to the rear of the wheels 11. A shaft 30 extends transversely through the frame 20 adjacent the rear end thereof. A sprocket 32 on the shaft 30 is connected with a sprocket 33 on the axle 29 of the rear wheels 11 by means of a chain 34. A cross member between the sides of the rear portion 20 of the frame provides a bearing for a pair of spaced shafts 35 which are rotated by suitable bevel gearing 36 on the ends of these shafts 35 and upon the shaft 30. Accordingly when the rear wheels 11 rotate, the shafts 35 are adapted to rotate at a desired speed ratio obtained by selecting the proper sizes of sprockets 32 and 33, and the correct type of bevel gearing.

An elevator for elevating the beets from the ground to a point considerably spaced from the ground is supported at one end by the shafts 35. The elevator B extends from the shafts 35 to a point somewhat near the front ends of the cones 28. Small guiding blades 37 extend from the front of the elevator B, and act to guide the tops of the beets between the opposed sides of the elevator B.

The elevator B comprises a pair of similar chains 38 which extend between sprockets 39 on the shafts 35 and a pair of sprockets 40 mounted upon angle iron supporting members 42. The two angle iron supports 42 are spaced apart, and at one end are supported by the shafts 35. The lower ends of the supports 42 are pivotally connected to links 43 which in turn are connected to levers or arms 44 rotatable upon the shaft 45. The shaft is rotated by means of a suitable lever 46, raising or lowering the front or lower end of the elevator B. The angle members 42 are held in spaced relationship by looping or arcuated connecting members 47 through which the tops of the beets may pass without hindrance.

The sprockets 39 and 40 are so associated with the angle member supports 42 that the chains 38 do not contact with the supports themselves along either side of these supports. The chains 38 are adjacent one another as illustrated in Figure 3 of the drawings, and are preferably provided with lugs 48 which assist in holding the beet tops between the chains, as the chains move to draw the beets up the elevator B.

In operation, the beet tops or the leafy portion on the top of the beets are guided between the chains 38 by the blades 37. The chains are driven in a manner to pull the beets up the inclined elevator B into position to be topped in a manner which will be hereinafter described. Shortly after the tops of the beets are guided between the chains 38, the cones 28 dig the beet from the earth, so that the beet is free to be elevated, suspended vertically from the chains 38. To accommodate various sizes of beet tops, and to make sure that even a beet with a very small top may be firmly engaged by the chains 38, I provide a series of resilient shoes 49 on each angle support 42 against which the chain 38 may bear. Ordinarily the chains 38 are quite close together, as is necessary to support a beet with a small top, but the resilient spring mounting of the shoes 49 allows the chains 38 to spread apart to accommodate a large beet top when necessary.

The beets are topped by means of a pair of overlapping cutting discs 50. These discs are mounted upon shafts 52 driven through bevel gearing 53 by the rear axle 29, and are supported by means of a yoke like support 54. The shafts 52 are geared together, and rotate at the same speed. A pair of angle iron guides 54' extend substantially horizontally from a point on the elevator B slightly above the plane of the cutter discs 50. These guides extend somewhat over the discs 50, in the position illustrated in Figures 5 and 6 of the drawings, and are positioned sufficiently close together to prevent a beet from passing between the same, while at the same time are far enough apart to permit the tops to pass through the space between them.

When the top of each beet being elevated bears against the guides 54', the inclined movement of the beet is arrested, and the beet travels along a horizontal path. The chains 38 permit the tops to be drawn down through the same the necessary amount to be drawn along the guides 54', but as the tops are quite long, still hold these tops firmly. If desired, a pair of small auxiliary chains 55 is interposed between the guides 54' and the extremity of the elevator B. These auxiliary chains engage the beet tops somewhat nearer the tops of the beets, after a portion of the tops have been drawn through the chains 38 by the horizontal path of the beets, and prevent any beet having an extraordinary short top from becoming entirely disengaged from the elevator B.

The beets are drawn into the cutter discs while moving along a horizontal path, and when the top of each beet is in engagement with the guides 42. Accordingly, each beet is properly introduced into position to be topped. In order to hold the beets, identified by the letter C in the drawings, in a vertical position as they are introduced into the cutter discs, I provide a pair of butter belts 56 having a series of vertical cleats thereupon which engage the beet suspended vertically and carry the beet into the discs in this position. The belts 56 are spaced apart at the entrance end of the same, and are ordinarily close together at the end of the same adjacent the discs. Each of the belts 56 is free to pivot radially about a vertical shaft 57, so that the belts may open or close to adjust themselves to varying diameters of beets.

It is obviously advantageous to pivot the belts 56 similarly and equally from the center. In order that the belts may move uniformly and equally, I provide a mechanism which acts to connect the belts and transmit the motion of one to the other. The belts 56 are driven from the shafts 57, which are rotated by the chains or belts 58 connecting these shafts with the shafts 52, driven by the movement of the harvester. One pulley 59 of each belt 56 is mounted directly upon the shafts 57, while the other pulley 60 is supported in the proper spaced relationship by means of connecting arms 62, one of which is mounted on each side of the pulleys to provide a proper bearing for the same. A short link 63 pivoted on each lower arm 62 is pivoted to a link 64 which in turn is pivotally connected to an arm 65 mounted upon a rotatable shaft 66. This connection may be seen in Figure 5 of the drawings. Each shaft 66 is connected by bevel gearing 67 to a shaft 68. Movement of either of the connecting arms 62 in an outward direction will act through this system of levers to move the opposite belt outward an equal distance. The spring 69 holds the belts 56 with a narrow opening between the ends of the same, and outward movement of the belts is accomplished under spring tension of the spring 69.

In topping the beets, it is beneficial to cut more of the top of the beet away when the beet is of large diameter than is necessary when the beet is small. Large diameter beets should therefore be cut lower on the beet than should small diameter beets. Therefore, I have provided a means of raising and lowering the cutting discs in unison according to the diameter of the beet. This is accomplished by securing a yoke shaped arm on the shaft 66, to move with the arm. The yoke arm is provided with inwardly extending pins 70 which engage in a slot 72 in the collar 73 attached to the disc. Accordingly, as the belts 56 move outwardly in unison from the center, the yoke arm 74 moves downwardly, lowering the cutter discs. As the large beet is expelled from the butter belts, and the belts close together by the force of the spring 69, the cutter discs again rise into normal position. It may be seen that the distance which the discs lower depends directly upon the diameter of the beet passing through the butter belts. The beets topped in this manner are cut off exactly in the proper position for each particular beet. The inward taper of the butter belts together, and the width of the opening between these belts at the incoming end, prevents more than one beet from contacting with these belts at a time.

In the operation of the machine, the beets are engaged by the tops, the beets dug from the ground, and elevated along an inclined plane to the horizontal guides. At this point, the beets travel along a horizontal path to the cutter knives, where the top is severed from the beet. The beets are allowed to drop into a receptacle 75, or onto a conveyor of any common type not illustrated in the drawings. The tops, after being severed, again travel along the inclined elevator to the end of the same, where they are dropped onto the slide 76, or otherwise disposed of.

The modification of elevator illustrated in Figure 4 of the drawings is made up of a series of V-shaped belts 77, two of which are mounted on one side of the elevator, and the other of which is mounted on the other side thereof, as illustrated in Figure 4. The tops are interlaced or crimped between the various belts, and cannot easily drop while being elevated.

It is understood that the modification of my machine as illustrated is for one particular purpose, namely, the digging and topping of beets. I desire to have it understood, however, that by making slight changes, my machine may be used for other similar purposes. For example, in the topping of carrots, the adjustable knife raising and lowering mechanism may be eliminated, as carrots can be topped the same distance from the top regardless of the diameter of the same. In a similar manner, my machine may be adjusted and changed to suit conditions of various crops, and may be used for the harvesting of any number of vegetables and plants.

I have provided a machine which functions efficiently to dig, top, and separate beets from their tops. My machine acts automatically to cut the proper amount of the top of the beet off with the cutter knives for each particular beet, according to the size thereof. My machine is adjustable to meet virtually any condition, and will compensate for any condition often met in the fields.

In accordance with the patent statutes, I have described the principles of operation of my beet harvester, and while I have endeavored to set forth the best embodiment thereof, I desire to have it understood that this is only illustrative of a means of carrying out my invention, and that obvious changes may be made within the scope of the following claims without departing from the spirit of the invention.

I claim:

1. A beet harvester including, means for digging beets, means for elevating beets, adjustable means for topping said beets, conveying means for supporting the bodies of the beets while being topped, and means operated by said conveying means for adjusting the position of said topping means according to the diameter of the beet being topped.

2. A beet harvester including, means for digging beets, means for carrying the beets into position to be topped, fixed means for regulating the position of the top of the beets, conveying means for supporting the bodies of the beets while being topped, and means operated by said conveying means for regulating the distance below the top of the beet at which the beet is to be topped.

3. A beet harvester including, means for digging beets, means for engaging the tops of the beets, means for elevating the beets suspended from said top engaging means, belt means for engaging the suspended beets to hold the same substantially vertical, cutting knives to sever the beets from the tops thereof, and means operated by said belt means for regulating the height of said topping means.

4. A beet harvester including, means for digging beets, means for elevating the beets along an inclined conveyor, fixed guides to bring each beet to an even height, butter belts to hold said beets during the topping thereof, means adjustable in position for topping the beets, and means connected with said butter belts to raise or lower said topping means according to the diameter of the beet.

5. A beet topping mechanism including, means for carrying the beets with the foliage collected and the body projecting vertically therefrom, means for quickly topping the foliage from the beets by cutting off more or less of the top of the body of the beet, means for engaging the body of the beets to push the same into said topping means, the position of said engaging means being adjusted by the diameter of the body of the engaged beet, and connections between the engaging means and the topping means for vertically positioning the topping means in accordance with the adjusted position of the engaging means.

6. A beet topping mechanism including, means for conveying the beets with the foliage collected and the body projecting vertically therefrom, means for quickly topping the foliage from the beets by cutting off more or less of the top of the body of the beet, said conveying means having provisions for moving the beets along a predetermined path into said topping means and for constraining the beets from deviation from said path, and including means engaging with the body of the beets and positioned thereby in accordance with the diameter thereof, and connections between the engageable means and the topping means for vertically positioning the topping means in accordance with the position of the engageable means.

7. A beet topping mechanism including, means for conveying the beets with the foliage collected and the body projecting vertically therefrom, means for quickly topping the foliage from the beets by cutting off more or less of the top of the body of the beet, said conveying means having provisions for moving the beets along a straight horizontal predetermined path into said topping means and for constraining the beets from vertical deviation from said path, and including means engageable with the body of the beets and positioned thereby in accordance with the diameter thereof, and connections between the engageable means and the topping means for vertically positioning the topping means in accordance with the position of the engaging means.

8. In combination, article conveying means for elongated articles having longitudinal axes comprising a device for aligning in a fixed definite plane the tops of articles conveyed therein, knives in the path of articles so conveyed and having cutting edges movable relatively to such definite plane, paired endless members engaging the bodies of such articles in succession, supports for said endless members having axes parallel the axes of the supported articles, said endless members normally converging in the path of articles in said conveyor and being movable away from one another by the articles in said conveyor, and connecting members between said paired endless members and said knives for shifting the latter coincident to movement of said endless members away from one another.

9. A conveyor for successive single articles the conveyor aligning the tops of the articles and moving all of such articles along a predetermined fixed path, knives in such path and having cutting edges movable relative to said fixed conveyor, a pair of opposed endless members below the level of said knives projecting convergingly at an end into the path of articles in said conveyor, and means for shifting the position of the cutting edges of said knives coincidentally with the engagement of the convergent ends of said endless members with an article in said conveyor.

10. A conveyor for successive single articles, the conveyor aligning the tops of the articles and moving all of such articles along a predetermined fixed path, knives in said path and having cutting edges movable relative to said fixed conveyor, paired members below the aligned article tops comprising opposed endless belts having a path of movement angular to that of the conveyor and converging at an end, and means for shifting the position of the cutting edges of said knives coincidentally with the engagement of the convergent ends of said belts with an article in said conveyor.

11. A conveyor for successive single articles, the conveyor aligning the tops of the articles and moving all of such articles along a fixed predetermined path, knives in said path and having cutting edges movable relative to said conveyor, paired members comprising opposed endless members having a path of movement angular to that of said conveyor and converging at an end, said paired members supporting said articles projecting from an edge thereof, means for moving said endless members in synchronism with the movement of articles in said conveyor, and means for shifting the position of the cutting edges of said knives to cut more or less of the projecting portion of the articles coincidentally with the engagement of the convergent ends of said endless members with an article in said conveyor.

12. Beet topping mechanism comprising means for conveying a beet transversely of its principal axis, a knife for removing an end section from the beet while in said conveying means and adjustable axially of the beet, and movable knife adjusting means actuated by said conveying means coincident with movement thereof transversely of the beet, said adjusting means engaging the side of the beet and being movable thereby.

13. A beet harvester including means for digging beets, means for carrying the beets into position to be topped, fixed guide means engaging the tops of the beets during movement thereof, means for topping the beets, conveying means for supporting the bodies of the beets while being topped, and means operated by said conveying means for adjusting the topping means relative to said fixed guide means for varying the amount of the top portion of the beet cut off in direct proportion to the diameter of the beet to be cut.

14. A beet harvester including topping cutters, conveying means for supporting the bodies of the beets while being topped, said topping means adjustable with respect to the line of travel of beets in said conveying means, and means operated by said conveying means for regulating said cutters to cut more or less from the top of the beets depending on the diameter of the beet.

GEORGE PIERSON.